US006272803B1

United States Patent
Stachowiak et al.

(10) Patent No.: US 6,272,803 B1
(45) Date of Patent: Aug. 14, 2001

(54) CONNECTOR SYSTEM FOR IN-LINE CONNECTION OF FREESTANDING PARTITIONS

(75) Inventors: Anthony A. Stachowiak, Belmont; Steven C. Gortsema, Grandville; Mark T. Slager, Caledonia, all of MI (US)

(73) Assignee: Steelcase Development Corporation, Caledonia, MI (US)

(*) Notice: Subject to any disclaimer, the term of this patent is extended or adjusted under 35 U.S.C. 154(b) by 0 days.

(21) Appl. No.: 09/238,456

(22) Filed: Jan. 28, 1999

(51) Int. Cl.[7] .................................................... E04B 2/74
(52) U.S. Cl. ............................ 52/239; 52/243; 52/36.5; 52/582.1; 52/481.2; 160/351; 403/403; 403/363
(58) Field of Search .................................. 52/238.1, 239, 52/36.4, 36.5, 36.6, 220.7, 481.1, 481.2, 241–243, 243.1, 731.9, 726.1, 726.2, 582.1–582.2; 403/231, 403, 363; 160/155, 351

(56) References Cited

U.S. PATENT DOCUMENTS

| 3,425,568 | | 2/1969 | Albright . | |
|---|---|---|---|---|
| 3,514,883 | | 6/1970 | Albright . | |
| 4,035,972 | | 7/1977 | Timmons . | |
| 4,118,903 | | 10/1978 | Coulthard . | |
| 4,174,911 | * | 11/1979 | Maccario et al. ................. | 403/405 |
| 4,250,676 | | 2/1981 | Presby . | |
| 4,269,005 | | 5/1981 | Timmons . | |
| 4,567,698 | | 2/1986 | Morrison . | |
| 4,619,486 | | 10/1986 | Hannah et al. . | |
| 4,625,483 | | 12/1986 | Zacky et al. . | |
| 4,761,922 | * | 8/1988 | Black ................................. | 52/36.6 |
| 4,883,330 | | 11/1989 | Armstrong et al. . | |
| 4,907,384 | | 3/1990 | Underwood . | |
| 4,914,878 | * | 4/1990 | Tamaki et al. .................... | 52/239 |
| 4,991,368 | * | 2/1991 | Amstutz ............................ | 52/241 |
| 5,220,871 | | 6/1993 | Grund et al. . | |
| 5,740,650 | * | 4/1998 | Seiber et al. ..................... | 52/239 X |
| 5,826,385 | * | 10/1998 | Dykstra et al. .................. | 52/36.6 X |
| 5,839,240 | * | 11/1998 | Elsholz et al. ................... | 52/242 |
| 5,906,079 | * | 5/1999 | Brickner et al. ................. | 52/239 |
| 5,943,834 | * | 8/1999 | Jeffers et al. .................... | 52/239 |

OTHER PUBLICATIONS

Exhibit A is a brochure entitled *Knoll—Hannah Desk System*, 18 pages, dated Oct. 1986.
Exhibit B is a brochure entitled *Knoll—Hannah Desk System*, 13 pages, undated but published in 1986.
Exhibit C is a publication entitled *Knoll—Hannah Desk System—Electrical Assembly Guide*, (12 pages), undated but published in 1986.
Exhibit D is a publication entitled *Knoll—Hannah Desk System—Assembly Guide*, 12 pages, undated but published in 1986.

* cited by examiner

*Primary Examiner*—Carl D. Friedman
*Assistant Examiner*—Winnie Yip
(74) *Attorney, Agent, or Firm*—Price Heneveld Cooper Dewitt & Litton

(57) ABSTRACT

A partition system includes adjacent partitions that have aligned top frame members with abutting and horizontally aligned cantilevered end sections. An in-line connector system includes a flat top connector and a U-shaped bottom connector that mateably span between the cantilevered end sections and that engage top and bottom surfaces, respectively, on the top frame members. Specifically, the top connector fits into a cavity in a top of the top frame member. The bottom connector includes a bottom wall and opposing sidewalls that matingly receive and engage bottom and side surfaces of the cantilevered end sections. The connectors combine with a beam-like strength that holds the cantilevered end sections in a particularly stable in-line condition.

13 Claims, 3 Drawing Sheets

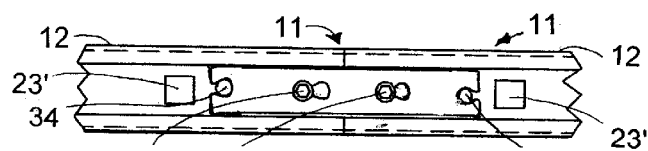
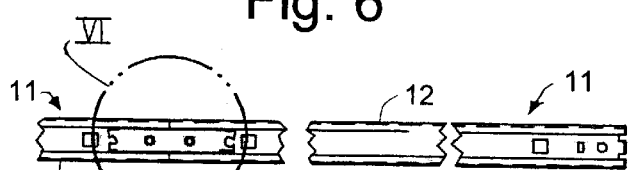
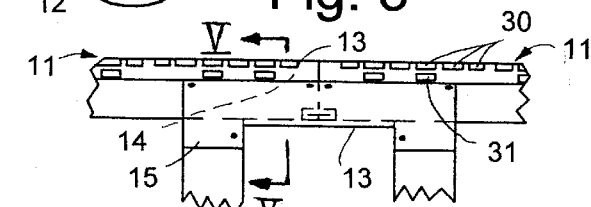
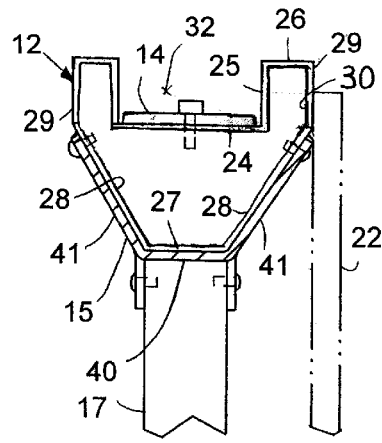
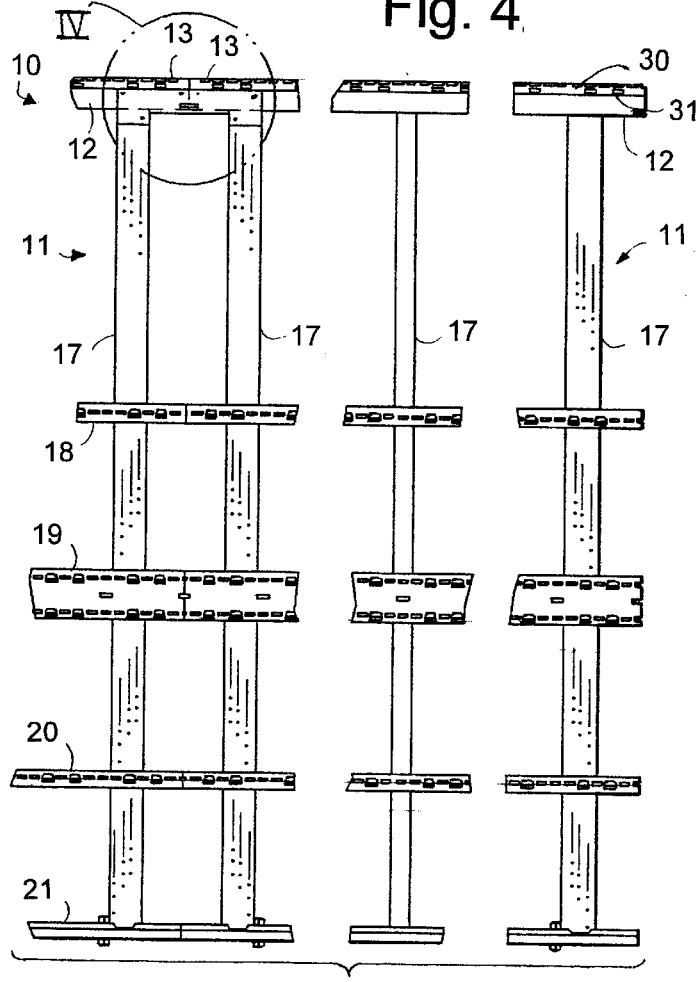
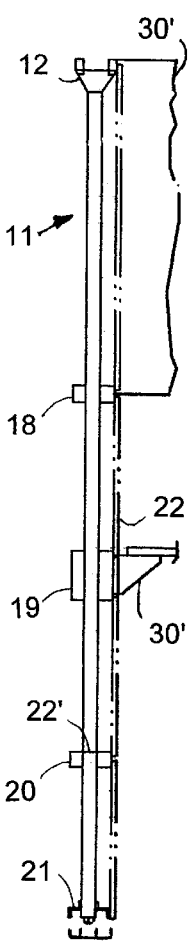

US 6,272,803 B1

CONNECTOR SYSTEM FOR IN-LINE CONNECTION OF FREESTANDING PARTITIONS

BACKGROUND OF THE INVENTION

The present invention concerns an in-line connection system for partitions.

Freestanding partition systems commonly include preconstructed rectangular partitions and connectors configured to interconnect the partitions in in-line and perpendicular arrangements. The in-line partition arrangements present special problems, since it is easy to site along the in-line partitions and see wandering and snaking of a long (or short) run of partitions. Notably, wandering and snaking is visually unacceptable to many consumers, since it can lead to a cheap appearance and also since it can cause irregular office sizes. Part of the reason for the wandering and snaking is that many known in-line connectors do not provide sufficient bending strength at the joint line to force the partitions into true alignment. Instead, many of the known in-line connectors allow the partitions to be connected at a slight angle relative to the other, either due to local deformations of the connectors and the partition and/or due to clearances and tolerances in the holes and other connecting features. This problem is aggravated in partition frames having horizontal frame members with cantilevered end sections that extend to vertical side edges of the partition frames, because the cantilevered end sections undergo torsional and bending stresses that aggravate the wandering and snaking effect. At the same time, the cantilevered end sections are advantageous in that they allow utilities and wiring to be more easily routed at the vertical side edges of the partition frame. For example, they allow easier routing when the wiring and utilities must be extended around corners into perpendicular partitions or when the wiring and utilities must be extended around corners upwardly into ceiling sources of utilities or downwardly to floor sources of utilities.

Accordingly, a connection system is needed that solves the aforementioned problems and that has the aforementioned needed advantages.

SUMMARY OF THE PRESENT INVENTION

In one aspect of the present invention, a partition system includes first and second partitions having aligned frame members with horizontally aligned cantilevered end sections that abut. The partition system further includes a U-shaped connector having an elongated cavity matingly receiving an aligned pair of cantilevered end sections. The U-shaped connector engages and is secured to each of the pair of cantilevered end sections, so that the pair of cantilevered end sections is stably held in alignment in the cavity defined by the U-shaped connector.

In another aspect of the present invention, a partition system includes first and second partitions having aligned horizontally extending top frame members, the top frame members having abutting end sections. Elongated top and bottom connectors span between the end sections, with the top and bottom connectors matingly engaging the end sections on top and bottom sides thereof. The top and bottom connectors are secured to each of the end sections, so that the end sections are stably held in alignment by the top and bottom connectors.

In still another aspect of the present invention, a connector system is provided for connecting first and second partitions, where the first and second partitions include horizontally extending frame members with abutting and aligned end sections. The connector system includes a U-shaped connector that mateably engages multiple sides of the end sections and that spans between the end sections. Fasteners secure the U-shaped connector to both of the end sections.

These and other aspects, objects, and advantages of the present invention will be understood and appreciated by those skilled in the art by reference to the present specification, claims, and appended drawings.

DESCRIPTION OF DRAWINGS

FIGS. 1–3 are front, side, and top fragmentary views, respectfully, of a partition system embodying the present invention, including a pair of connectors interconnecting partitions, the partitions having their cover panels removed for clarity;

FIG. 4 is an enlargement of the circled area IV in FIG. 1;

FIG. 5 is a cross section taken along line V—V in FIG. 4;

FIG. 6 is an enlarged view of the circled area VI in FIG. 3;

DETAILED DESCRIPTION OF PREFERRED EMBODIMENT

Figure 7:
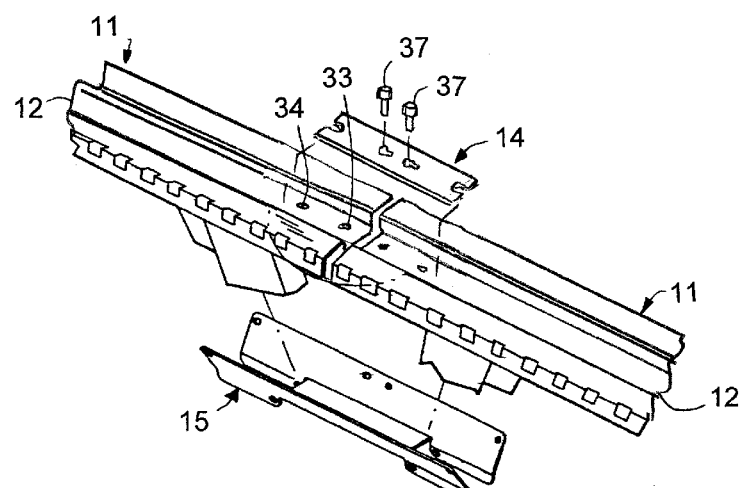
FIG. 7 is an exploded perspective view of FIG. 4.

A partition system 10 (FIG. 1) embodying the present invention includes first and second partitions 11 having aligned horizontally extending top frame members 12 with abutting cantilevered end sections 13. Elongated top and bottom connectors 14 and 15 span between the cantilevered end sections 13 and matingly engage the end sections 13 on top and bottom sides of the top frame members 12 in a particularly stable and secure arrangement. The connectors 14 and 15 cause the partitions 11 to be accurately and "truly" aligned in a way that reduces wandering and snaling of the partitions, resulting in a straighter line of partitions, even in a relatively long in-line run of the partitions 11.

Partitions 11 (FIG. 1) include a partition frame formed by vertically spaced-apart uprights 17 and a plurality of horizontally spaced-apart horizontal frame members 12 and 18–21, with frame members 12 being the upper one of the frame members. The uprights 17 and the horizontal frame members 18–21 have rectangular cross sections, with the uprights 17 forming a center layer and the frame members 18–21 forming outer layers on opposing sides of the center layer (see FIG. 2). Notably, the illustrated intermediate frame member 20 includes a transverse web 22' (FIG. 2) that extends between the opposite side sections of the frame member 20, while the illustrated frame members 19 are separate parts that attach to outboard faces of the uprights 17. Cover panels 22 (sometimes called skins) are releasably attached to the outboard flat faces of the horizontal frame members 12 and 18–21. The transverse web 22' and also the top frame member 12 include vertically open apertures 23' for wire routing and for receiving bayonet connectors for mounting stackable partitions on top of the partitions 11 (FIG. 6). The spaces between the uprights 17 and the apertures in the web 22' create wireways that permit vertical routing of wiring and utilities. The spaces between the horizontal frame members 12 and 18–21 create large open areas and wireways that permit wiring and utilities to be flexibly routed within the partitions 11 and from partition to partition. This array of vertical and horizontal wireways also allows the wiring and utilities to be laid into the partition system 10.

The top horizontal frame member 12 (FIG. 5) is tubular and includes a U-shaped top wall with a center transverse flange 24, vertical inside flanges 25, and horizontal outer flanges 26. The top horizontal frame member 12 further includes a U-shaped bottom wall formed by a flat bottom flange 27 and diagonally/outwardly angled flanges 28. The outboard edges of outer flanges 26 are connected to the outboard edges of the angled flanges 28 by vertical face flanges 29. The face flanges 29 include a horizontal row of regularly spaced slots 30. The slots 30 are configured to receive brackets for supporting furniture units, such as bookbinder bins 30' (FIG. 2), shelves, worksurfaces 30", or perpendicularly oriented partitions 11 connected at locations between the vertical side edges of a "spine" or base partition 11. The face flanges 29 further include apertures 31 for receiving clips on the cover panels 22 to releasably support the cover panels 22.

Figures 8, 9:
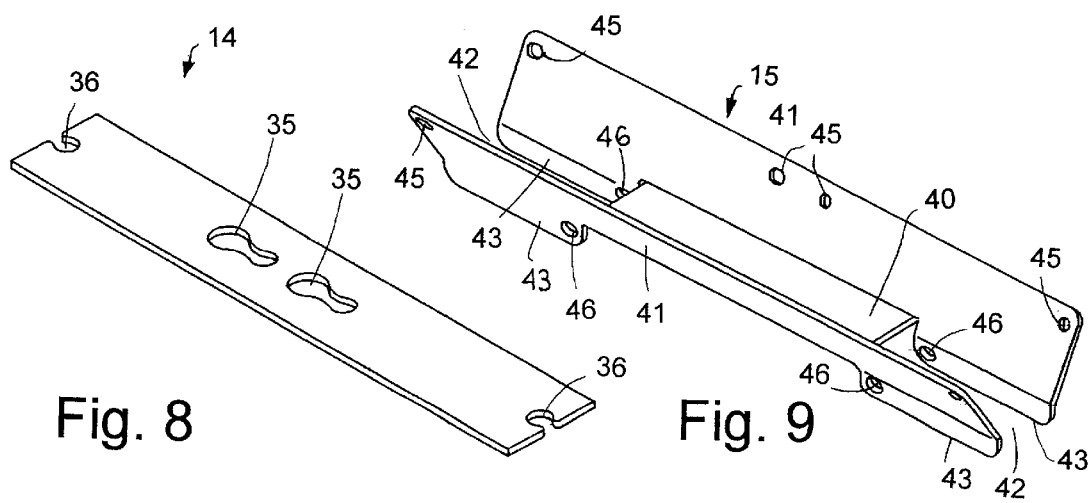
FIG. 8 is a perspective view of the top one of the top connectors shown in FIG. 7.
FIG. 9 is a perspective view of the bottom one of the top connectors shown in FIG. 7.

The U-shaped top walls 24–26 (FIG. 5) define a concave top area or surface 32 for receiving the top connector 14, and further include a pair of apertures 33 and 34. The top connector 14 is elongated and flat and has a width that closely matches or slightly clears a width between the vertical inside flanges 25. The top connector 14 comprises a flat plate that includes identical opposing halves, each including a pair of apertures 35 and 36 (FIG. 7) that align with the pair of partition apertures 33 and 34 on respective abutting partitions 11. Screws 37 are extended through the aligned apertures 33/35 and screws 38 are extended through the aligned apertures 34/36. Notably, it is contemplated that one of the screws 37 or 38 can be replaced with a tab (or window) integrally formed in the transverse top wall 24 for receiving a window (or tab) on the partition 11, if desired. The illustrated apertures 35 nearest a middle of the top connector 14 are keyhole shaped (FIG. 8) with a large end and a small end. This allows an installer to partially threadably install the screw 37 into the partition aperture 33, place the in-line top connector 14 over the head of the screw 37 and slide it sideways, and then tighten the screw 37.

The bottom connector 15 (FIG. 9) includes a horizontal transverse flange 40 and outwardly angled flanges 41 that define a U-shaped cross section. Flanges 40 and 41 closely match the shape defined by the bottom of the partition flanges 27 and 28. This allows the bottom connector 15 to mateably engage and capture a bottom of the cantilevered end sections 13 of the top horizontal frame member 12. The ends of the transverse flange 40 are cutaway to form notches 42 to make room for the uprights 17, such that the connectors 15 extend beyond the cantilevered end sections 13 overlapping onto the outermost uprights 17. Attachment flanges 43 extend downwardly from the ends of the angled flanges 41. The angled flanges 41 include holes 45 for receiving screws to attach the angled flanges 41 to the partition angled flanges 28. The connector attachment flanges 43 also include holes 46 for receiving screws to attach the attachment flanges 43 to the sides of the uprights 17. The present connector arrangement is particularly strong and causes a truly aligned in-line connection to occur for several reasons, including the following reasons: the natural structural strength due to the cross sectional shape of the U-shaped bottom connector 15; the manner in which the bottom connector 15 captures the top frame member 12; the way that the bottom connector 15 is attached to the uprights 17, as well as to the horizontal frame member 12; and the addition and construction of the top connector 14.

Figure 10:
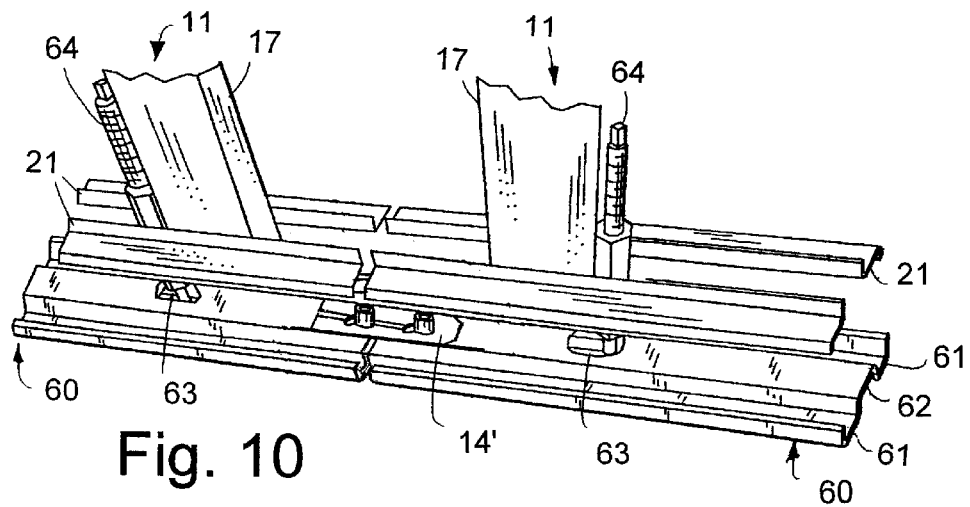
FIG. 10 is a top fragmentary perspective view of a lower part of the partitions shown in FIG. 1, including the floor-adjacent connector of the present connection system.
Figure 11:
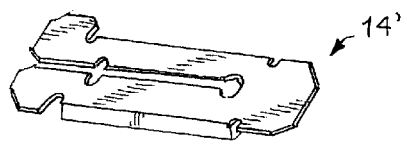
FIG. 11 is an exploded view of FIG. 10.

A floor channel 60 (FIGS. 10 and 11) includes floor-engaging flanges 61 and a panel-engaging raised flange 62. The raised flange 62 includes an aperture 63 for engaging a leveler 64 on the partitions 11. The floor channel 60 can be connected in-line with a connector 14' (see FIG. 11) in a way very similar to when top connector 14 is used on top frame member 12 (see FIG. 7).

Figure 12:
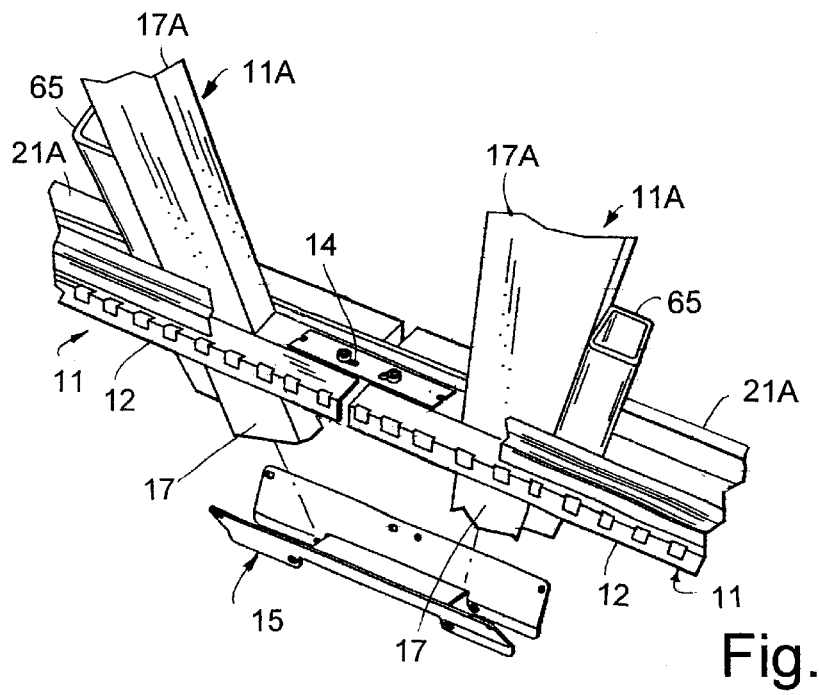
FIG. 12 is a partially exploded perspective view similar to FIG. 7, but showing a "stacker" partition stacked on top of the base partition of FIG. 1 and secured to the base partition.

The connectors 14 and 15 can also be used when stacker partitions 11A (FIG. 12) are attached atop the base/lower partitions 11. The stacker partitions 11A include uprights 17A and multiple horizontal frame members (not shown except for lower frame members 21A). The stacker partitions 1 11a are secured in place by tubular connectors 65 that extend through frame members 12 and 21A and that are bolted to uprights 17 and 17A.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A partition system comprising:
   first and second partitions having vertical uprights and aligned frame members with horizontally aligned cantilevered end sections that abut; and
   a U-shaped connector that includes an elongated cavity matingly receiving the cantilevered end sections, the U-shaped connector engaging and being secured to the aligned pair of the cantilevered end sections and including notches receiving the uprights, so that the cantilevered end sections are stably held in alignment in the cavity defined by the U-shaped connector.

2. The partition system defined in claim 1, wherein the U-shaped connector includes a bottom and opposing sides configured to closely engage corresponding bottoms and opposing side faces of the aligned pair of cantilevered end sections.

3. The partition system defined in claim 2, wherein the opposing sides comprise angled flanges, and wherein the opposing side faces of the partition are correspondingly angled to mateably engage the angled flanges.

4. The partition system defined in claim 3, wherein the frame member is located along a top of the partition.

5. A partition system comprising:
   first and second partitions having aligned top frame members with horizontally aligned cantilevered end sections that abut, the partitions including uprights supporting the frame members; and
   a U-shaped connector that includes an elongated cavity matingly receiving the cantilevered end sections, the U-shaped connector including a bottom with notches configured to receive the uprights and opposing sides configured to closely engage corresponding bottoms and opposing side faces of the cantilevered end sections, the opposing sides of the U-shaped connector comprising angled flanges, and the opposing side faces of the cantilevered end sections correspondingly angled to mateably engage the angled flanges, the U-shaped connector being secured to the cantilevered end sections and the upright, so that the cantilevered end sections are stably held in alignment in the cavity defined by the U-shaped connector.

6. The partition system defined in claim 1, including a top connector that is elongated and that engages top surfaces of the pair of cantilevered end section.

7. A partition system comprising:

first and second partitions having aligned frame members with horizontally aligned cantilevered end sections that abut;

a top connector that is elongated and that engages top surfaces of the pair of cantilevered end sections; and a bottom U-shaped connector that includes an elongated cavity matingly receiving bottom surfaces of the pair of the cantilevered end sections, the U-shaped connector engaging and being secured to the cantilevered end sections, so that the cantilevered end sections are stably held in alignment in the cavity defined by the U-shaped connector;

wherein the partition includes uprights that support the frame member, the uprights being spaced from a vertical side edge of the partition in a manner defining the cantilevered end sections, and wherein the bottom U-shaped connector includes notches in its bottom that are configured to receive a closest one of the uprights.

8. A partition system comprising:

first and second partitions having aligned frame members with horizontally aligned cantilevered end sections that abut, and uprights spaced inboard from vertical side edges of the partitions; and a U-shaped connector that includes an elongated cavity matingly receiving the cantilevered end sections, the U-shaped connector engaging and being secured to the cantilevered end sections, so that the cantilevered end sections are stably held in alignment in the cavity defined by the U-shaped connector, the U-shaped connector further including first flanges attached to the top horizontal frame member and second flanges attached to a nearest one of the uprights.

9. A partition system comprising:

first and second partitions having aligned horizontally extending top frame members, the top frame members having abutting end sections; and elongated top and bottom connectors spanning between the end sections of the top frame members, the bottom connector having a U-shaped cross-section, the top and bottom connectors matingly engaging the end sections on top and bottom sides thereof and being secured to each of the end sections, so that the end sections of the top frame members are stably held in alignment by the top and bottom connectors;

wherein the partition includes uprights supporting the frame member, and wherein the bottom connector includes a notch configured to receive a closest one of the uprights.

10. The partition system defined in claim 9, wherein the bottom connector has first bottom and angled sides, and wherein the frame member has second bottom and angled sides that mateably engage the first bottom and angled sides of the bottom connector.

11. A system comprising:

first and second partitions, the first and second partitions including horizontally extending frame members with abutting and aligned cantilevered end sections and further including vertical uprights supporting the horizontally extending frame members;

a U-shaped connector that mateably receives and engages multiple sides of the cantilevered end sections and that spans between the cantilevered end sections, the U-shaped connector further including ends mateably engaging the vertical uprights of the first and second partitions; and fasteners that secure the U-shaped connector to both of the cantilevered end sections and to the vertical uprights.

12. The system defined in claim 11, wherein the connector includes a U-shaped cross section configured to mateably engage bottom and sides of the end sections.

13. The system defined in claim 12, including a top connector shaped to mateably engage a top surface of the end sections.

* * * * *